United States Patent
Satzger et al.

(10) Patent No.: US 10,830,068 B2
(45) Date of Patent: Nov. 10, 2020

(54) METHOD AND DEVICE FOR THE GENERATIVE PRODUCTION OF A COMPONENT USING A LASER BEAM AND CORRESPONDING TURBO-ENGINE COMPONENT

(71) Applicants: Wilhelm Satzger, Munich (DE); Siegfried Sikorski, Munich (DE); Thomas Hess, Munich (DE); Karl-Heinz Dusel, Unterschleissheim (DE); Hans-Christian Melzer, Jetzendorf (DE)

(72) Inventors: Wilhelm Satzger, Munich (DE); Siegfried Sikorski, Munich (DE); Thomas Hess, Munich (DE); Karl-Heinz Dusel, Unterschleissheim (DE); Hans-Christian Melzer, Jetzendorf (DE)

(73) Assignee: MTU AERO ENGINES AG, Munich (DE)

( * ) Notice: Subject to any disclaimer, the term of this patent is extended or adjusted under 35 U.S.C. 154(b) by 1241 days.

(21) Appl. No.: 14/359,657

(22) PCT Filed: Oct. 13, 2012

(86) PCT No.: PCT/DE2012/001000
§ 371 (c)(1),
(2) Date: Jun. 9, 2014

(87) PCT Pub. No.: WO2013/075683
PCT Pub. Date: May 30, 2013

(65) Prior Publication Data
US 2014/0334924 A1    Nov. 13, 2014

(30) Foreign Application Priority Data

Nov. 22, 2011    (DE) .................... 10 2011 086 889

(51) Int. Cl.
*B23K 26/34*    (2014.01)
*F01D 9/02*    (2006.01)
(Continued)

(52) U.S. Cl.
CPC .............. *F01D 9/02* (2013.01); *B22F 3/1055* (2013.01); *B22F 3/24* (2013.01); *B22F 5/009* (2013.01);
(Continued)

(58) Field of Classification Search
CPC ............ B23K 26/342; B23K 2201/001; B23K 35/0244; B22F 3/1055; B22F 3/24;
(Continued)

(56) References Cited

U.S. PATENT DOCUMENTS

| 7,455,740 | B2 | 11/2008 | Bostanjoglo et al. |
| 2005/0268998 | A1* | 12/2005 | Bostanjoglo .......... B22F 3/1055 148/538 |

(Continued)

FOREIGN PATENT DOCUMENTS

| DE | 4319000 C1 | 6/1994 |
| DE | 19853978 C1 | 5/2000 |

(Continued)

*Primary Examiner* — Brian W Jennison
(74) *Attorney, Agent, or Firm* — Abel Schillinger, LLP

(57) ABSTRACT

In a method for the generative production of a component (3), in particular of a turbo-engine component, wherein material (4) is bonded layer-by-layer selectively to a layer disposed therebeneath or to a substrate (6), according to the invention a laser (1A; 1B; 2) additionally acts on the material (4) before, during and/or after the bonding.

17 Claims, 1 Drawing Sheet

(51) Int. Cl.
- *B22F 3/105* (2006.01)
- *B28B 1/00* (2006.01)
- *B22F 5/00* (2006.01)
- *B22F 3/24* (2006.01)
- *B23K 35/02* (2006.01)
- *B23K 26/342* (2014.01)
- *B32B 37/00* (2006.01)
- *B32B 37/06* (2006.01)
- *B32B 38/00* (2006.01)
- *B23K 101/00* (2006.01)

(52) U.S. Cl.
CPC ........ *B23K 26/342* (2015.10); *B23K 35/0244* (2013.01); *B28B 1/001* (2013.01); *B32B 37/00* (2013.01); *B32B 37/06* (2013.01); *B32B 38/0008* (2013.01); *B23K 2101/001* (2018.08); *B32B 2310/028* (2013.01); *B32B 2310/0843* (2013.01); *F05D 2240/12* (2013.01); *Y02P 10/295* (2015.11)

(58) Field of Classification Search
CPC ......... B22F 5/009; B32B 37/00; B32B 37/06; B32B 38/0008
See application file for complete search history.

(56) References Cited

U.S. PATENT DOCUMENTS

| | | | |
|---|---|---|---|
| 2005/0288813 A1* | 12/2005 | Yang | B22F 3/1055 700/119 |
| 2006/0054079 A1* | 3/2006 | Withey | C30B 29/02 117/108 |
| 2007/0095800 A1* | 5/2007 | Chen | B23K 26/0066 219/121.6 |
| 2007/0145629 A1 | 6/2007 | Ebert et al. | |
| 2007/0176312 A1* | 8/2007 | Clark | B22F 3/1055 264/40.1 |
| 2009/0120924 A1* | 5/2009 | Moffatt | B23K 26/0626 219/385 |
| 2011/0052412 A1 | 3/2011 | Ader et al. | |
| 2011/0287185 A1 | 11/2011 | Felstead et al. | |
| 2013/0064706 A1 | 3/2013 | Schwarze et al. | |

FOREIGN PATENT DOCUMENTS

| | | |
|---|---|---|
| DE | 19953000 C2 | 5/2001 |
| DE | 10309519 A1 | 9/2004 |
| DE | 102005025199 A1 | 12/2006 |
| DE | 102006049216 A1 | 4/2008 |
| DE | 202008013569 U1 | 12/2008 |
| EP | 1400339 A1 | 3/2004 |
| EP | 1815936 A1 | 8/2007 |
| WO | 2010061174 A2 | 6/2010 |
| WO | 2011066989 A1 | 6/2011 |

\* cited by examiner

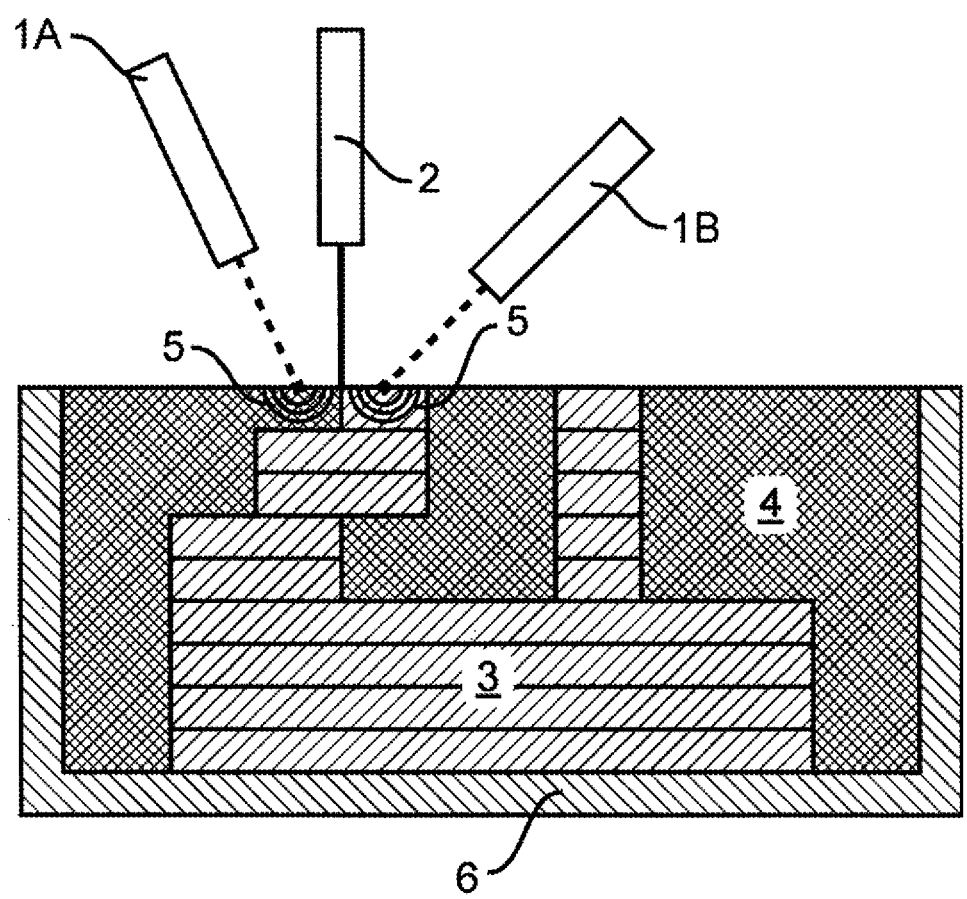

METHOD AND DEVICE FOR THE GENERATIVE PRODUCTION OF A COMPONENT USING A LASER BEAM AND CORRESPONDING TURBO-ENGINE COMPONENT

BACKGROUND OF THE INVENTION

1. Field of the Invention

The invention relates to a method and a device for the generative production of a component and a component produced therewith.

2. Discussion of Background Information

In generative methods, material is bonded layer-by-layer and selectively to a layer or a substrate thereunder. In this manner, even complex components and relatively small run sizes can advantageously be produced. One generative method, known for example from DE 10 2005 025 199 A1, is in particular laser sintering, in which the individual particles of the loose material are thermally bonded to one another by means of a laser. Alternatively, DE 43 19 000 C1 proposes welding the particles by means of MIG welding or plasma arc welding.

Disadvantageously, material properties of components made in this way, in particular strength, toughness, elasticity, surface hardness and the like, are commonly only between those of cast parts and of forged parts made of the same material. However, high demands are placed on, in particular, material properties of gas turbine components such as guide vanes or rotor blades, which demands are for example only satisfied by forged components.

DE 10 2005 025 199 A1 and DE 43 19 000 C1 both propose a compaction of the loose material by mechanical contact before laser sintering or welding. However, this presupposes a pressure load in the immediate vicinity of the material regions to be bonded, which can be problematic in terms of apparatus.

It is an object of the present invention to improve the generative production of components.

SUMMARY OF THE INVENTION

The present invention provides a method, a device for carrying out this method, and a component produced according to this method as set forth in the independent claims. Advantageous embodiments are the subject matter of the dependent claims.

According to the present invention, a component is produced generatively by material being bonded layer by layer and selectively together, to a layer thereunder and/or to a substrate. To that effect, the unbonded material is arranged at the desired layer height on top of the layer thereunder or the substrate, preferably as loose material, in particular in powder form, or also as a solution in a fluid. The material is then selectively bonded together, that is to say within the layer cross section proper which is to be produced, and where appropriate to a layer thereunder or to a substrate in the shape of the desired layer cross section of the component to be produced, and thereby solidified. This can equally be performed chemically, for instance by reacting binders, or thermally, in particular by sintering, melting, welding and the like. The selective bonding together of the material, that is to say the selective, local solidification thereof, can be performed in the same way as the bonding of the material to the layer thereunder or to the substrate.

The selective bonding can equally be performed by selective arrangement of material only in the region of the desired layer cross section or by selective application to the material of, for example, a chemical agent, light and/or heat, only in the region of the desired layer cross section. The selective application can equally be performed by masking regions which are not to be loaded or by local, controlled application with an oriented application region, in particular an application beam or jet. In one preferred embodiment, the material is selectively bonded by means of a controlled laser beam, in that the laser beam exposes the desired layer cross section and thus heats the material to such an extent that the particles of the material bond together and to the layer thereunder or to the substrate, or sets off a chemical reaction of a binder.

According to the invention, a laser additionally acts on the material before, during and/or after bonding. It is in particular possible, by means of a pulsed application, to generate structure-borne sound waves, preferably ultrasound waves, directly in the material. Such structure-borne sound waves may be formed as transverse and/or longitudinal waves. They preferably propagate through the material in the manner of spherical waves, concentrically about an impingement point of a laser beam on the material. Since the structure-borne sound waves are generated in the material by the pulsed laser, it becomes possible to create the waves without great expenditure in terms of apparatus, in particular also in the immediate vicinity of that spot at which the material is solidified and, where appropriate, bonded to the layer thereunder or to the substrate, in that the pulsed laser beam is directed there for example by means of corresponding optics, an optical waveguide or the like. Additionally or as an alternative, it is possible, by means of the additional laser application, for material to also be sublimed before, during and/or after bonding. The impact thus generated by the expansion of the sublimed material can in particular induce the above-mentioned structure-borne sound waves.

Advantageously, the application according to the invention generates residual stresses, in particular compressive stresses, in the material and/or increases the number of dislocations in a material lattice, in particular a metal lattice, which can improve the material properties, in particular the strength and the grain size.

The additional application may occur during bonding of the material. In particular, if the bonding is effected thermally, the structure-borne sound waves can produce the above-mentioned changes in the microstructure and residual stresses in the material which is heated, shapeable, preferably at least partially plasticized or liquefied for the purpose of bonding. Additionally or alternatively, as for example also in the case of cold forging, the laser may additionally act on the already-bonded and possibly entirely or partly cooled material, wherein further changes in the microstructure and residual stresses can be generated, preferably once again by means of sublimation or structure-borne sound, in particular ultrasound. Additionally or alternatively, the laser can also additionally act on the material before bonding, whereby in particular a loose material, in particular a powder, or a solution can be homogenized and compacted. In one preferred embodiment, in which, for bonding, the material is heated to a maximum temperature, in particular by means of a laser, the additional exposure occurs in a time period in which the temperature of the material is at least 50%, in particular at least 75% and preferably at least 90% of this maximum temperature.

To the extent that the bonding already occurs by means of exposure to a laser, in particular sufficient heating of the material to be bonded, this laser can additionally act on the material before and/or after bonding. To that end, in a preferred embodiment, the laser can be differently controlled, in particular focused, for bonding and for additional exposure, and/or can act on the material with varying power. The laser is preferably pulsed, at least for the additional exposure.

In one preferred embodiment, at least two lasers are provided which, preferably operated in parallel, can also permit an additional exposure of the material while it is bonded to the layer thereunder or to the substrate. It is equally possible, as mentioned above, to switch the laser one or more times between the heating for bonding and the preferably pulsed additional application, in particular in order to generate structure-borne sound waves and/or sublimation of material.

In particular, if a separate laser is provided for the additional application, this can be used in a preferred development for finishing a bonded material layer. In particular, this laser can contour or post-contour the bonded material layer, in that material is removed from at least one outer and/or inner edge of this layer. While the edges of the material layer which has undergone primary generative forming exhibit irregularities due to the size of the material particles, a smoother edge can be produced by means of a laser contouring process. Additionally or alternatively, the material layer can be surface-finished, in particular polished, using the laser, in that material is removed from at least some areas of its surface.

Particularly advantageously, gas turbine components can be produced according to the invention, in the case of which high demands are placed on the material properties in spite of the complex shaping.

BRIEF DESCRIPTION OF THE DRAWINGS

Further features and advantages become apparent from the dependent claims and from the exemplary embodiment. To that end, the single, partially schematic FIG. 1 shows the production of a component using a device according to one embodiment of the present invention.

FIG. 1 shows a device having a material container with a substrate 6 formed integrally therewith, within which a metal material 4, for example an aluminum alloy, is arranged as a loose material in powder form.

DETAILED DESCRIPTION OF THE INVENTION

A laser arrangement comprises a bonding laser 2 and at least one of the two additional lasers 1A, 1B. For a more compact representation of embodiments described in more detail hereinbelow, these two are represented together in one FIGURE, it being possible in variants which are not shown for the laser arrangement to have only the lasers 1A and 2, only the lasers 1B and 2 or only the laser 2, which is then alternately operated as the laser for bonding and as the laser for the additional exposure.

The material container and the laser arrangement can be moved relative to each other by means of a movement apparatus (not shown). In order to generatively produce a complex component 3, material powder 4 is first arranged on the substrate 6 at a predetermined layer height, for example in the range between 0.05 mm and 5 mm. The bonding laser 2 then acts on this layer selectively in the regions of the desired component end face cross section. In the exposed regions, the metal powder 4 thus heated bonds together, and preferably for fixing purposes also to the substrate 6, by sintering or melting and thus forms a solid first material layer. The material container and the laser arrangement are then moved apart by one layer height and material powder is arranged in this layer height on top of the material layer thereunder. The bonding laser 2 now acts once again on this layer selectively in the regions of the desired component layer cross section. In the exposed regions, the metal powder 4 thus heated bonds together, and to the layer thereunder, by sintering or melting and thus forms a subsequent solid material layer. This procedure is repeated until the component 3 has been built up layer by layer from the material 4. FIG. 1 shows a state in which an uppermost material layer is being selectively bonded to the material layer thereunder by means of the bonding laser 2. The excess, unbonded material can subsequently be removed and the component 3 can be separated from the substrate 6.

According to one embodiment of the present invention, the laser arrangement comprises, in addition to the bonding laser 2, the additional laser 1A. This laser acts in a pulsed manner on the material powder 4 in the layer currently being worked on, immediately before the bonding laser heats this region, as is indicated in FIG. 1 by means of a dotted beam. In those places where the pulsed beam hits the loose, as-yet unbonded material powder, the latter heats up suddenly in a punctiform manner, in a preferred embodiment with sublimation of material. The consequent expansion generates, directly in the material 4, concentric spherical waves 5 which compact and homogenize the material powder immediately before the powder is bonded to the layer thereunder by means of the bonding laser 2. The pulsed exposure is preferably carried out at a frequency which generates structure-borne sound waves 5 in the ultrasound range.

According to a further embodiment of the present invention, the laser arrangement comprises, in addition to the bonding laser 2, the additional laser 1B. This laser acts, in a pulsed manner, on the material which is bonding or bonded together and to the layer thereunder while or after, preferably immediately after, the bonding laser heats this region. In those places where the pulsed beam hits the already-bonded or just-bonding material, which may still be highly heated, the latter heats up again, this time in a punctiform manner and suddenly, in a preferred embodiment with sublimation of material. The consequent expansion again generates, directly in the still shapeable or already re-cooled material 4, concentric spherical waves 5, preferably in the ultrasound range, which now generate residual stresses in the material layer and change the microstructure thereof, in particular the type and/or number of dislocations. In this manner it is possible to improve the material properties of the component produced, in particular its strength, in parallel with, or in the immediate temporal vicinity of, the layer-by-layer construction thereof, this being particularly advantageous.

The additional laser 1B can additionally also finish, in particular contour and/or polish by removal of material, the surface and/or the edges of the material layer bonded by means of the bonding laser 2.

Both of the aforementioned embodiments may also be realized by alternately using the laser 2 as a bonding laser for bonding material together and to the layer thereunder or the substrate, and as an additional laser for generating structure-borne sound waves, and by correspondingly switching or controlling the laser to that end. In operation, it is possible to provide, as an additional laser, another emitter form, in particular a pulsed emission, another, in particular higher, radiation power and/or another target region on the material.

LIST OF REFERENCE NUMERALS 1A, 1B additional laser
2 bonding laser
3 component
4 material powder
5 structure-borne sound waves
6 substrate

What is claimed is:

1. A method for the generative production of a component from a material, wherein the method comprises at least one of (i) bonding material selectively together within a layer cross section, (ii) bonding material to a layer beneath the material and (iii) bonding material to a substrate, and wherein the method further comprises exposing the material before, during and after the bonding to radiation from a first, pulsed laser to at least one of generate structure-borne sound waves in the material and sublime a part of the material.

2. The method of claim 1, wherein radiation from the first laser generates structure-borne sound waves in the material.

3. The method of claim 2, wherein the structure-borne sound waves comprise ultrasound waves.

4. The method of claim 1, wherein a part of the material is sublimed by the radiation from the first laser.

5. The method of claim 1, wherein the bonding of the material is carried out chemically and/or thermally.

6. The method of claim 1, wherein the bonding of the material comprises exposing the material to radiation from a second laser.

7. The method of claim 6, wherein the same laser device is alternately employed as the first laser and as the second laser.

8. The method of claim 6, wherein the first laser and the second laser are separate lasers.

9. The method of claim 1, wherein radiation from a third laser, which also is a pulsed laser, is employed to contour and/or polish at least one of a surface and edges of a layer of material that has been bonded.

10. The method of claim 9, wherein radiation from a second laser is employed for bonding the material.

11. The method of claim 10, wherein the same laser device is alternately employed as the second laser and the third laser.

12. The method of claim 6, wherein a third laser, which is a pulsed laser, is employed to contour and/or polish at least one of a surface and/or edges of a layer of material that has been bonded.

13. The method of claim 12, wherein the same laser device is alternately employed as the second laser and the third laser or as the first laser and the second laser.

14. The method of claim 12, wherein the same laser device is alternately employed as the first, second and third laser.

15. The method of claim 1, wherein the first laser acts on the material while a temperature of the material is at least 50% of a maximum temperature of the material that is reached during the bonding thereof.

16. The method of claim 15, wherein the first laser acts on the material while the temperature of the material is at least 90% of the maximum temperature of the material that is reached during the bonding thereof.

17. A turbomachine component, wherein the component has been produced by the method of claim 1.

* * * * *